United States Patent
Li et al.

(10) Patent No.: US 11,755,654 B2
(45) Date of Patent: Sep. 12, 2023

(54) CATEGORY TAG MINING METHOD, ELECTRONIC DEVICE AND NON-TRANSITORY COMPUTER-READABLE STORAGE MEDIUM

(71) Applicant: Beijing Baidu Netcom Science Technology Co., Ltd., Beijing (CN)

(72) Inventors: Qian Li, Beijing (CN); Yabing Shi, Beijing (CN); Ye Jiang, Beijing (CN); Chunguang Chai, Beijing (CN); Yong Zhu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 149 days.

(21) Appl. No.: 17/173,318

(22) Filed: Feb. 11, 2021

(65) Prior Publication Data
US 2021/0263974 A1   Aug. 26, 2021

(30) Foreign Application Priority Data
Feb. 20, 2020   (CN) .......................... 202010104207.9

(51) Int. Cl.
*G06F 16/90*   (2019.01)
*G06F 16/9032*   (2019.01)
(Continued)

(52) U.S. Cl.
CPC ...... *G06F 16/90332* (2019.01); *G06F 16/906* (2019.01); *G06F 16/90335* (2019.01); *G06F 40/30* (2020.01); *G06N 3/049* (2013.01)

(58) Field of Classification Search
CPC ............. G06F 16/90332; G06F 16/906; G06F 16/90335; G06F 40/30
See application file for complete search history.

(56) References Cited

U.S. PATENT DOCUMENTS 10,007,944 B2 *   6/2018   Johnson ............. G06Q 30/0623
10,698,932 B2 *   6/2020   Wang ..................... G06N 5/027
(Continued)

FOREIGN PATENT DOCUMENTS

CN   105528403 A   4/2016
CN   106372060 A   2/2017
(Continued)

OTHER PUBLICATIONS

Distantly Supervised Biomedical Named Entity Recognistion with Dictionary Expansion, IEEE 2019.*
(Continued)

*Primary Examiner* — Daniel A Kuddus
(74) *Attorney, Agent, or Firm* — HOUTTEMAN LAW LLC

(57) ABSTRACT

Provided by the present disclosure is a new category tag mining method, involving the field of knowledge graph technology, and including: obtaining a plurality of queries during a current preset time period; labeling a category tag on each query of the plurality of queries, by using a pre-trained sequence labeling model, to extract the category tag currently corresponding to the query from the query; and removing a category tag already existing in a preset current category tag library from category tags currently corresponding to all the queries, and determining a remaining category tag as a new category tag. The present disclosure also provides an electronic device and a non-transitory computer-readable storage medium.

16 Claims, 10 Drawing Sheets

(51) Int. Cl.
*G06F 16/906* (2019.01)
*G06F 16/903* (2019.01)
*G06F 40/30* (2020.01)
*G06N 3/049* (2023.01)

(56) References Cited

U.S. PATENT DOCUMENTS

| | | | | |
|---|---|---|---|---|
| 10,795,939 | B2* | 10/2020 | Chen | G06N 3/08 |
| 11,250,056 | B1* | 2/2022 | Batsakis | G06F 16/2471 |
| 11,269,939 | B1* | 3/2022 | Sammer | H04L 67/55 |
| 11,294,941 | B1* | 4/2022 | Sammer | G06F 9/542 |
| 11,354,349 | B1* | 6/2022 | Xu | G06N 3/04 |
| 2009/0012991 | A1* | 1/2009 | Johnson | G06Q 30/0603 |
| 2010/0332478 | A1* | 12/2010 | Duman | G06F 40/169 |
| | | | | 707/738 |
| 2011/0099181 | A1* | 4/2011 | Aminian | G06F 16/637 |
| | | | | 707/754 |
| 2015/0234927 | A1* | 8/2015 | Cao | G06F 16/907 |
| | | | | 707/722 |
| 2018/0341698 | A1* | 11/2018 | Wang | G06N 5/02 |
| 2018/0365257 | A1* | 12/2018 | Chen | G06N 3/08 |
| 2019/0179842 | A1 | 6/2019 | Shah et al. | |

FOREIGN PATENT DOCUMENTS

| | | |
|---|---|---|
| CN | 106886516 A | 6/2017 |
| CN | 107273500 A | 10/2017 |
| CN | 107515849 A | 12/2017 |
| CN | 107992585 A | 5/2018 |
| CN | 108009293 A | 5/2018 |
| CN | 108038103 A | 5/2018 |
| CN | 108664473 A | 10/2018 |
| CN | 108875781 A | 11/2018 |
| CN | 109522424 A | 3/2019 |
| CN | 109543153 A | 3/2019 |
| CN | 109684645 A | 4/2019 |
| CN | 109857854 A | 6/2019 |
| CN | 110222171 A | 9/2019 |
| CN | 110705293 A | 1/2020 |
| CN | 110717339 A | 1/2020 |
| CN | 101784022 A | 7/2020 |
| JP | 2005-284776 A | 10/2005 |
| JP | 2010-176285 A | 8/2010 |
| JP | 2016-164724 A | 9/2016 |
| KR | 10-2018-0111979 A | 10/2018 |
| WO | 2018040762 A1 | 3/2018 |
| WO | WO2019/061996 A1 * | 4/2019 |

OTHER PUBLICATIONS

Wang et al., Distantly Supervised Biomedical Named Entity Recognition with Dictionary Expansion. IEEE 2019.*
European Patent Office, Extended European Search Report dated Jul. 13, 2021 for application No. EP21156285.5.
Wang Xuan et al: "Distantly Supervised Biomedical Named Entity Recognition with Dictionary Expansion", 2019 IEEE International Conference on Bioinformatics and Biomedicine, IEEE, Nov. 18, 2019.
Korean Patent Office, KR10-2021-0021383 First Office Action dated Apr. 21, 2022.
Japan Patent Office, JP2021-024436 First Office Action dated Feb. 1, 2022.
Junpei Miyake, "Web Search Query Segmentation based on Query Log and Snippet Word Concatenation Frequency", Proceedings of 17th Annual Meeting of Association for Natural Language Processing, tutorial, main conference, workshop [CD-ROM], Association for Natural Language Processing, Mar. 7, 2011, pp. 1075-1078.
China Patent Office, CN202010104207.9 First Office Action dated Jan. 3, 2023.
Wang, et al., "Distantly Supervised Biomedical Named Entity Recognition with Dictionary Expansion," Conference Paper, 2019 IEEE International Conference on Bioinformatics and Biomedicine, 2019, pp. 496-503.

* cited by examiner

CATEGORY TAG MINING METHOD, ELECTRONIC DEVICE AND NON-TRANSITORY COMPUTER-READABLE STORAGE MEDIUM

CROSS-REFERENCE TO RELATED APPLICATIONS

The present application claims the priority from Chinese Patent Application No. 202010104207.9, filed with the Chinese Patent Office on Feb. 20, 2020, the content of which is hereby incorporated herein by reference in its entirety.

TECHNICAL FIELD

Embodiments of the present disclosure relate to the field of knowledge graph technology, particularly relate to a new category tag mining method, an electronic device and a non-transitory computer-readable storage medium.

BACKGROUND

With the widespread use of Internet, more and more new category words appear in queries in the search field and scenario. The so-called category word refers to a word representing a type of entities such as persons, events, and objects. For example, the words of "museum", "library", "cake", "flower", "grass", "tree", etc. are all category words. The so-called new category word refers to a category word not included in an existing category thesaurus.

Therefore, identifying and mining a new category word from a query entered by a user in the search scenario can effectively help a search engine understand a real intention and behavior of the user's search, and is very important to improve the accuracy of the search result.

SUMMARY

According to embodiments of the present disclosure, a new category tag mining method, an electronic device and a non-transitory computer-readable storage medium are provided.

In a first aspect, according to embodiments of the present disclosure, provided is a method for mining new category tag, including: obtaining a plurality of queries during a current preset time period; labeling a category tag on each query of the plurality of queries, by using a pre-trained sequence labeling model, to extract the category tag currently corresponding to the query from the query; and removing a category tag already existing in a preset current category tag library from category tags currently corresponding to all the queries, and determining a remaining category tag as a new category tag.

In some embodiments, the mining method further includes: obtaining a plurality of samples of queries pre-labeled with category tags; and performing model training on a preset neural network model, by using the plurality of samples of queries as an input of the preset neural network model and using the pre-labeled category tags of the plurality of samples of queries as an output of the preset neural network model, to obtain the sequence labeling model.

In some embodiments, the preset neural network model includes a first semantic representation model, a second semantic representation model connected with the first semantic representation model, a first bidirectional Gated Recurrent Unit (Bi-GRU) layer connected with the second semantic representation model, a second Bi-GRU layer connected with the first Bi-GRU layer, a conditional random field (CRF) connected with the second Bi-GRU layer, and a CRF parsing layer connected with the CRF.

In some embodiments, the step of obtaining the plurality of samples of queries pre-labeled with the category tags includes: obtaining a plurality of historical queries and a plurality of preset category tags; filtering all historical queries containing at least one of the preset category tags out from all the historical queries, by using a distant supervision method; and determining the plurality of samples of queries from all the historical queries containing at least one of the preset category tags.

In some embodiments, before the step of removing the category tag already existing in the preset current category tag library from the category tags currently corresponding to all the queries, and determining the remaining category tag as the new category tag, the mining method further includes: for each category tag currently corresponding to the query, extracting a word located before and adjacent to the category tag from the query as a current detection word, in response to the category tag being in the preset current category tag library; detecting whether a part of speech of the current detection word is a preset part of speech, wherein the preset part of speech is any one of a noun, an adjective, and a noun adjective; extracting a word located before and adjacent to the current detection word from the query as a new current detection word, in response to the part of speech of the current detection word being the preset part of speech; repeating the step of detecting whether the part of speech of the current detection word is the preset part of speech, until a current detection word not having the preset part of speech is detected; and combining the category tag and all detection words detected to have the preset part of speech, according to an order of the category tag and all the detected detection words in the query, and using a combined result as the category tag currently corresponding to the query.

In some embodiments, before the step of removing the category tag already existing in the preset current category tag library from the category tags currently corresponding to all the queries, and determining the remaining category tag as the new category tag, the mining method further includes: for each category tag currently corresponding to the query during the current preset time period, determining whether the category tag ends with a category tag being in the current category tag library; retaining the category tag, in response to the category tag ending with the category tag being in the current category tag library; and removing the category tag, in response to the category tag not ending with the category tag being in the current category tag library.

In some embodiments, before the step of removing the category tag already existing in the preset current category tag library from the category tags currently corresponding to all the queries, and determining the remaining category tag as the new category tag, the mining method further includes: for each category tag currently corresponding to the query, detecting whether a sentence of the category tag is fluency, by using a preset sentence fluency model; retaining the category tag, in response to the sentence of the category tag being fluency; and removing the category tag, in response to the sentence of the category tag being not fluency.

In some embodiments, before the step of removing the category tag already existing in the preset current category tag library from the category tags currently corresponding to all the queries, and determining the remaining category tag as the new category tag, the mining method further includes: for each category tag currently corresponding to the query, detecting a frequency of the category tag of appearing in the category tags currently corresponding to all the queries; retaining the category tag, in response to the frequency being greater than or equal to a preset frequency threshold; and removing the category tag, in response to the frequency being less than the preset frequency threshold.

In a second aspect, according to embodiments of the present disclosure, provided is an electronic device, including: at least one processor; a memory storing at least one program thereon; and at least one I/O interface connected between the at least one processor and the memory, and configured to implement information interaction between the at least one processor and the memory; wherein when the at least one program is executed by the at least one processor, the at least one processor implements: obtaining a plurality of queries during a current preset time period; labeling a category tag on each query of the plurality of queries, by using a pre-trained sequence labeling model, to extract the category tag currently corresponding to the query from the query; and removing a category tag already existing in a preset current category tag library from category tags currently corresponding to all the queries, and determining a remaining category tag as a new category tag.

In some embodiments, the at least one processor is configured to: obtain a plurality of samples of queries pre-labeled with category tags; and perform model training on a preset neural network model, by using the plurality of samples of queries as an input of the preset neural network model and using the pre-labeled category tags of the plurality of samples of queries as an output of the preset neural network model, to obtain the sequence labeling model; wherein the preset neural network model includes a first semantic representation model, a second semantic representation model connected with the first semantic representation model, a first bidirectional Gated Recurrent Unit (GRU) layer connected with the second semantic representation model, a second bidirectional GRU layer connected with the first bidirectional GRU layer, a conditional random field connected with the second bidirectional GRU layer, and a conditional random field parsing layer connected with the conditional random field.

In some embodiments, the at least one processor is configured to: obtain a plurality of historical queries and a plurality of preset category tags; filter all historical queries containing at least one of the preset category tags out from all the historical queries, by using a distant supervision method; and determine the plurality of samples of queries from all the historical queries containing at least one of the preset category tags.

In some embodiments, before removing the category tag already existing in the preset current category tag library from the category tags currently corresponding to all the queries, and determining the remaining category tag as the new category tag, the at least one processor is configured to: for each category tag currently corresponding to the query, extract a word located before and adjacent to the category tag from the query as a current detection word, in response to the category tag being in the preset current category tag library; detect whether a part of speech of the current detection word is a preset part of speech, wherein the preset part of speech is any one of a noun, an adjective, and a noun adjective; extract a word located before and adjacent to the current detection word from the query as a new current detection word, in response to the part of speech of the current detection word being the preset part of speech; repeat the step of detecting whether the part of speech of the current detection word is the preset part of speech, until a current detection word not having the preset part of speech is detected; and combine the category tag and all detection words detected to have the preset part of speech, according to an order of the category tag and all the detected detection words in the query, and use a combined result as the category tag currently corresponding to the query.

In some embodiments, before removing the category tag already existing in the preset current category tag library from the category tags currently corresponding to all the queries, and determining the remaining category tag as the new category tag, the at least one processor is configured to: for each category tag currently corresponding to the query during the current preset time period, determine whether the category tag ends with a category tag being in the current category tag library; retain the category tag, in response to the category tag ending with the category tag being in the current category tag library; and remove the category tag, in response to the category tag not ending with the category tag being in the current category tag library.

In some embodiments, before removing the category tag already existing in the preset current category tag library from the category tags currently corresponding to all the queries, and determining the remaining category tag as the new category tag, the at least one processor is configured to: for each category tag currently corresponding to the query, detect whether a sentence of the category tag is fluency, by using a preset sentence fluency model; retain the category tag, in response to the sentence of the category tag being fluency; and remove the category tag, in response to the sentence of the category tag being not fluency.

In some embodiments, before removing the category tag already existing in the preset current category tag library from the category tags currently corresponding to all the queries, and determining the remaining category tag as the new category tag, the at least one processor is configured to: for each category tag currently corresponding to the query, detect a frequency of the category tag of appearing in the category tags currently corresponding to all the queries; retain the category tag, in response to the frequency being greater than or equal to a preset frequency threshold; and remove the category tag, in response to the frequency being less than the preset frequency threshold.

In a third aspect, according to embodiments of the present disclosure, provided is a non-transitory computer-readable storage medium storing a computer program thereon, wherein the computer program is executed for implementing the mining method described in any of the above embodiments.

According to the new category tag mining method, the electronic device and the non-transitory computer-readable storage medium provided by the embodiments of the present disclosure, the category tags are labeled on the queries obtained during the current preset time period, by using the pre-trained sequence labeling model; and the labeled category tags are checked for duplication, according to the current category tag library, to dig out the new category tag from the labeled category tags, so as to realize the mining of the new category tag with high timeliness.

BRIEF DESCRIPTION OF THE DRAWINGS

The accompanying drawings are intended to provide a further understanding of the embodiments of the present disclosure, constitute a part of the specification. The drawings, together with the embodiments of the present disclosure, are intended to explain the present disclosure, rather than limiting the present disclosure. With the detailed description of exemplary embodiments with reference to the accompanying drawings, the above and other features and advantages will become more apparent to those skilled in the art. In the drawings.

DETAILED DESCRIPTION

In order to enable those skilled in the art to better understand the technical solutions of the present disclosure, a new category tag mining method and device, an electronic device and a non-transitory computer-readable storage medium provided by the embodiments of the present disclosure will be described in detail below in conjunction with the accompanying drawings.

Although exemplary embodiments will be described in more detail below with reference to the accompanying drawings, the exemplary embodiments can be embodied in various forms, and should not be interpreted as limitation to the present disclosure. Rather, these embodiments are provided for facilitating thorough and complete understanding of the present disclosure, and enabling those skilled in the art to fully understand the scope of the present disclosure.

The embodiments and the features thereof in the embodiments can be combined with each other if no conflict is incurred.

As used herein, the term "and/or" includes any and all combinations of one or more of the related listed items.

The terms used herein are intended to describe specific embodiments, rather than limiting the present disclosure. As used herein, the singular forms "a/an" and "the" are also intended to include the plural forms, unless otherwise clearly indicated by the context. It should also be understood that when the terms "include" and/or "made of" are used in the present specification, it specifies the presence of the described features, integers, steps, operations, elements and/or components, but does not exclude the presence or addition of one or more other features, integers, steps, operations, elements, components, and/or groups thereof.

Unless otherwise defined, the meanings of all terms (including technical and scientific terms) used herein are the same as those commonly understood by those of ordinary skill in the art. It should also be understood that terms such as those defined in commonly used dictionaries should be interpreted as having meanings consistent with their meanings in the related technology and in the background of the present disclosure, and will not be interpreted as having idealized or over formal meanings, unless specifically defined as such herein.

Figure 1:
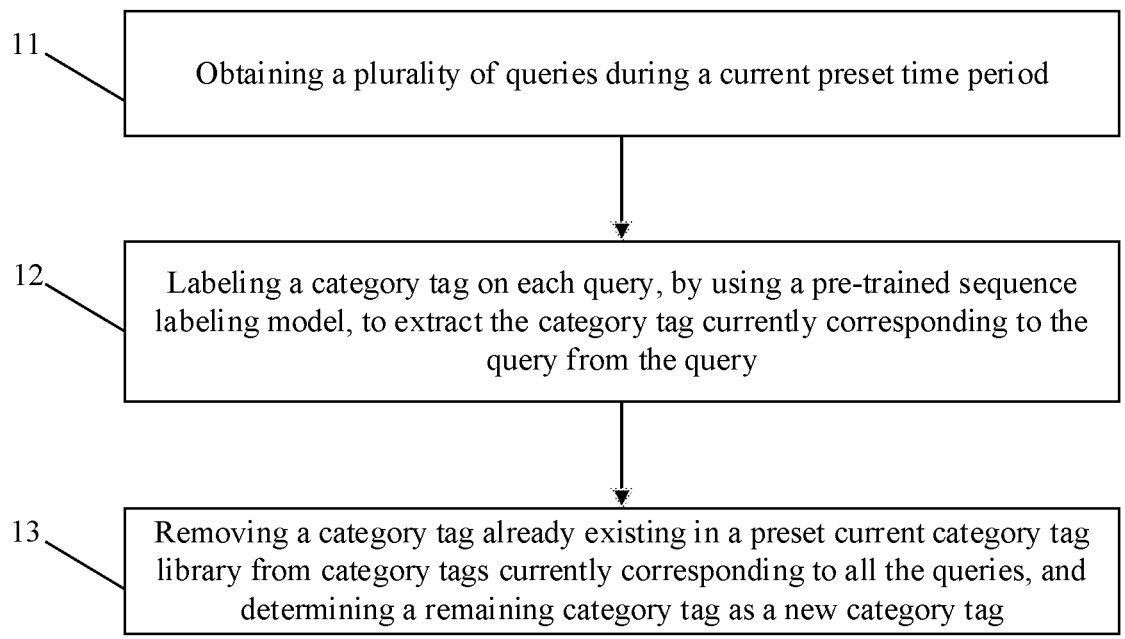
FIG. 1 is a flowchart of a new category tag mining method according to an embodiment of the present disclosure.

FIG. 1 is a flowchart of a new category tag mining method according to an embodiment of the present disclosure. As shown in FIG. 1, the method may be executed by a new category tag mining device, the device may be implemented by software and/or hardware, and the device may be integrated in an electronic device such as a server. The new category tag mining method may include the following steps.

In step 11, a plurality of queries during a current preset time period are obtained.

In step 11, the plurality of queries (i.e., searching texts) received by an interactive system during the current preset time period are obtained. The interactive system may be an intelligent terminal, platform or application providing an intelligent interactive service to a user, such as an intelligent speaker, an intelligent video speaker, an intelligent story machine, an intelligent interactive platform, an intelligent interactive application, a search engine, etc. The embodiments of the present disclosure do not particularly limit the implementation of the interactive system, as long as the interactive system can interact with the user.

In the embodiments of the present disclosure, the above-mentioned "interaction" may include a speech interaction and a text interaction. The speech interaction is based on technologies such as voice recognition, speech synthesis, natural language understanding, etc.

In various of practical application scenarios, the interactive system is provided with an intelligent human-computer interaction experience that "can hear, can speak and understand you". The speech interaction can be applied to multiple application scenarios such as intelligent question and answer, intelligent playback, intelligent search, etc. The text interaction is realized based on technologies such as text recognition, extraction, natural language understanding, etc., and can also be applied to the above-mentioned multiple application scenarios.

In the embodiments of the present disclosure, a query is text information. In any one of the above-mentioned application scenarios, when the user interacts with the interactive system, the user can input voice information or text information into the interactive system. The text information refers to a text in a natural language.

In some embodiments, the query may be obtained by: obtaining voice information and performing operations such as voice recognition and voice conversion on the voice information to generate the query, when the interactive system receives the voice information; or obtaining text information as the query directly, when the interactive system receives the text information.

In the embodiments of the present disclosure, the preset time period may be an hour-level time period, a day-level time period, a week-level time period, or a month-level time period, etc., which may be specifically determined according to practical applications, and are not limited in the embodiments of the present disclosure. For example, the preset time period may be one hour, one day, one week, or one month. It should be understood that the current preset time period refers to a most recent preset time period. For example, if the preset time period is one day, the current preset time period refers to a time period of the most recent one day.

In step 12, a category tag is labeled on each query of the plurality of queries, by using a pre-trained sequence labeling model, to extract the category tag currently corresponding to the query from the query.

In the embodiments of the present disclosure, a category tag refers to a category word contained in the query. The category word refers to a word that represents a type of entities such as persons, events, and objects. For example, the words of "museum", "library", "cake", "flower", "grass", "tree", "car", "mobile phone", etc. are all category words.

In the embodiments of the present disclosure, the sequence labeling model is pre-trained, an input of the sequence labeling model is the query, and an output of the sequence labeling model is the category tag corresponding to the query.

In step 12, for each query, when the query is input into the pre-trained sequence labeling model, at least one category tag currently corresponding to the query is output by the sequence labeling model. That is, a quantity of category tags in each query may be one or more.

Figure 2:
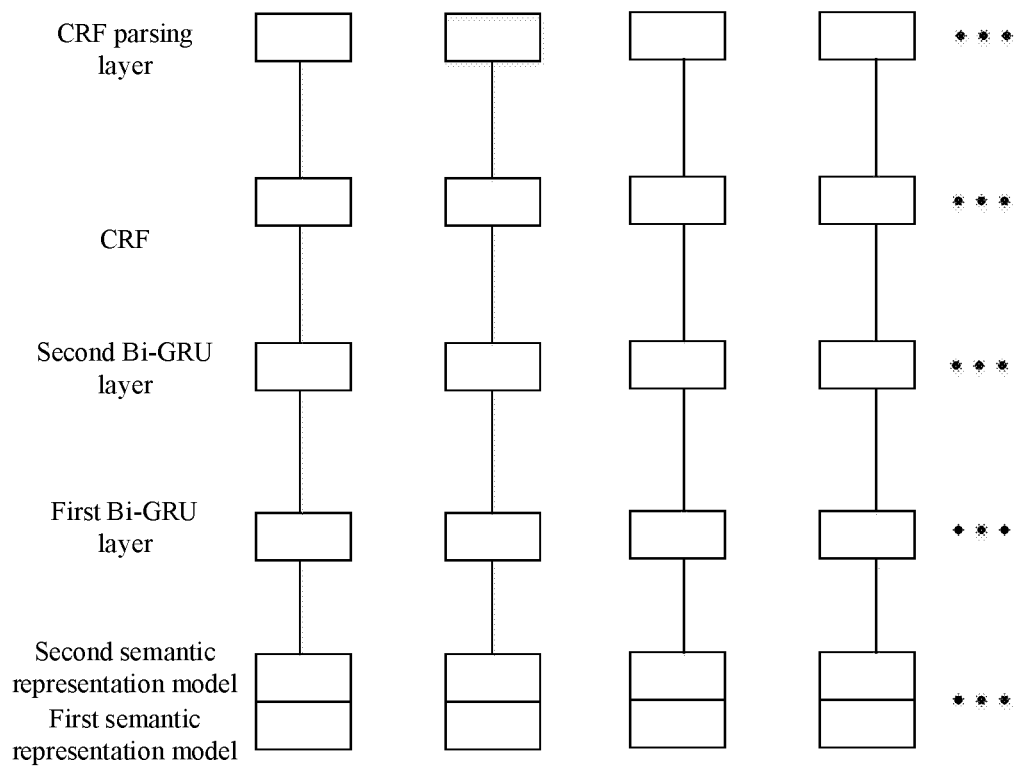
FIG. 2 is a block diagram of a preset neural network model in an embodiment of the present disclosure.

In the embodiments of the present disclosure, all category tags currently corresponding to all the queries can be labeled by the sequence labeling model. The sequence labeling model is an end to end sequence labeling model based on deep learning. The sequence labeling model may be determined through performing model training on a preset neural network model by using samples of queries pre-labeled with category tags. FIG. 2 is a block diagram of the preset neural network model in an embodiment of the present disclosure. As shown in FIG. 2, the preset neural network model includes two pre-trained semantic representation models (i.e., a first semantic representation model and a second semantic representation model), two Bi-GRU layers (i.e., a first Bi-GRU layer and a second Bi-GRU layer), a CRF, and a CRF parsing layer. The first semantic representation model is connected with the second semantic representation model, the first Bi-GRU layer is connected with the second semantic representation model, the Bi-GRU layer is connected with the first Bi-GRU layer, the CRF is connected with the second Bi-GRU layer, and the CRF parsing layer is connected to the CRF. In some embodiments, a semantic representation model may adopt an Enhanced Representation from kNowledge IntEgration (ERNIE) model.

In step 13, a category tag already existing in a preset current category tag library is removed from the category tags currently corresponding to all the queries, and a remaining category tag is determined as a new category tag.

In the embodiments of the present disclosure, the preset current category tag library stores existing category tags that have been mined. In the above step 12, the sequence labeling model may be used to label the category tags currently corresponding to all the queries obtained during the current preset time period; and then, in step 13, the current category tag library may be used to check duplication on the category tags currently corresponding to all the queries obtained during the current preset time period. In other words, in step 13, for each category tag currently corresponding to each query output by the sequence labeling model, it is determined whether the category tag is an existing category tag. When the category tag is determined to be an existing category tag, a removal process is performed, so that the category tags already existing in the current category tag library are removed from the category tags currently corresponding to all the queries. Then a category tag that does not exist in the current category tag library is digged out, i.e., the new category tag is mined.

In the embodiments of the present disclosure, after mining the new category tag, the new category tag is stored in the current category tag library to update the current category tag library; and queries are obtained during a next preset time period, and continue to mine a new category tag.

According to the new category tag mining method provided by the embodiments of the present disclosure, the category tags are labeled on the queries obtained during the current preset time period, by using the pre-trained sequence labeling model; and the labeled category tags are checked for duplication, according to the current category tag library, to dig out the new category tag from the labeled category tags, so as to realize the mining of the new category tag with high timeliness.

Figure 3:
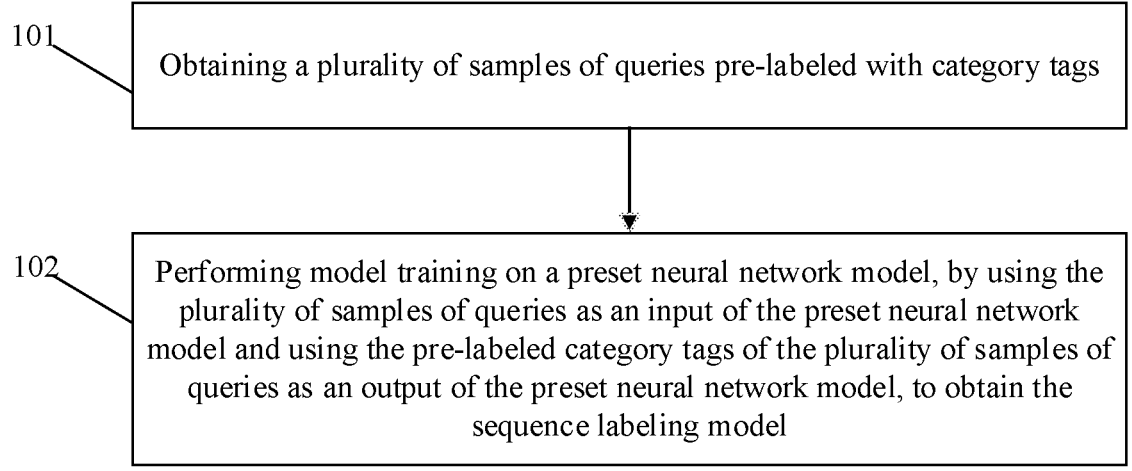
FIG. 3 is another flowchart of a new category tag mining method according to an embodiment of the present disclosure.

FIG. 3 is another flowchart of a new category tag mining method according to an embodiment of the present disclosure. In some embodiments, as shown in FIG. 3, a difference between this mining method and the mining method provided by any of the above-mentioned embodiments is that: before step 11, this mining method further includes the following steps 101 and 102. The following will only describe step 101 and step 102. For the description of other steps of this mining method, refer to the description of any of the above-mentioned embodiments for details.

In step 101, a plurality of samples of queries pre-labeled with category tags are obtained.

Figure 4:
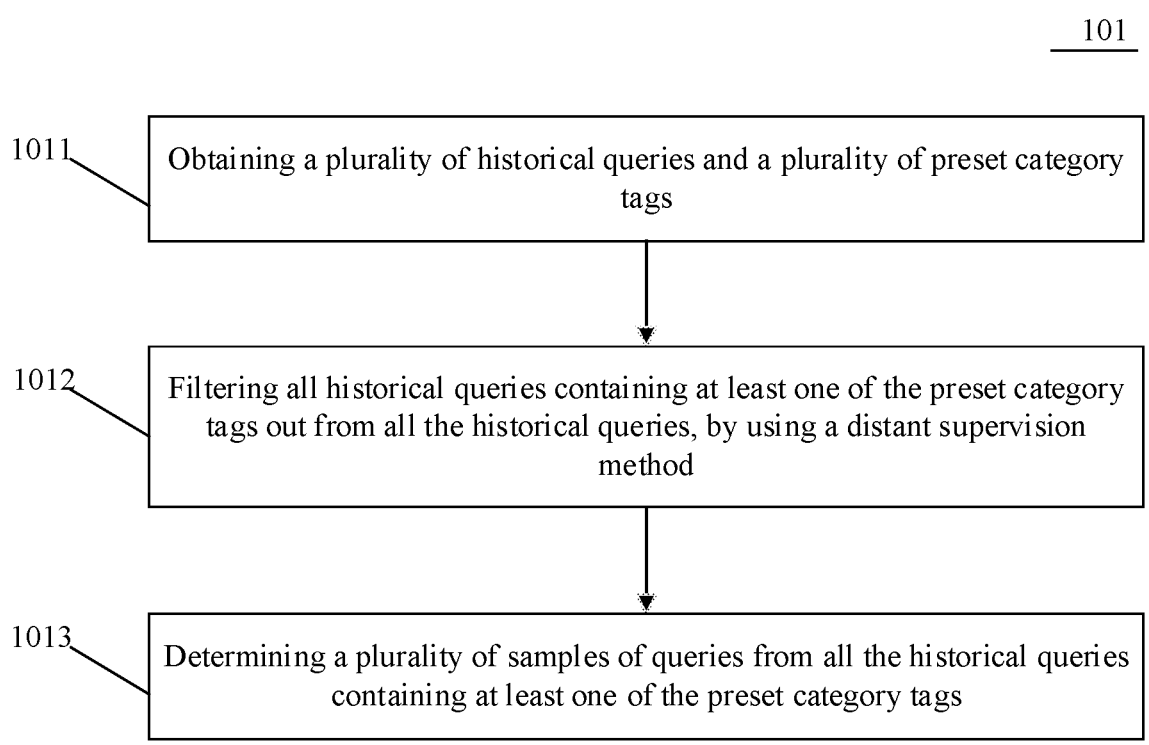
FIG. 4 is a flowchart of a specific implementation of the step 101 shown in FIG. 3.

FIG. 4 is a flowchart of a specific implementation of the step 101 shown in FIG. 3. As shown in FIG. 4, in some embodiments, the step 101 may include the following steps.

In step 1011, a plurality of historical queries and a plurality of preset category tags are obtained.

A historical query may be obtained from a historical search log of the above-mentioned interactive system, and a preset category tag may be an existing category tag that has been mined.

In step 1012, all historical queries containing at least one of the preset category tags are filtered out from all the historical queries, by using a distant supervision method.

In step 1012, for each historical query, the distant supervision method is used to mark a word in the historical query that exactly matches any one of the plurality of preset category tags. That is, it is detected whether the historical query contains any one of the plurality of preset category tags. When it is detected that the historical query contains any one of the plurality of preset category tags, the historical query is retained; otherwise, the historical query is removed, so that all the historical queries containing any one of the plurality of preset category tags are filtered out from all the historical queries. For example, suppose that the plurality of historical queries are text A, text B, and text C, respectively, and the plurality of preset category tags are a, b, and c, respectively. Then in step 1012, for text A, when text A contains any one of the preset category tags a, b, and c, the text A is retained, otherwise the text A is removed. In the same way, when text B contains any one of the preset category tags a, b, and c, text B is retained; when text C contains any one of the preset category tags a, b, and c, text C is retained; and the rest may be deduced by analogy.

In step 1013, the plurality of samples of queries are determined from all the historical queries containing at least one of the preset category tags.

In some embodiments, in step 1013, analyses of sentence patterns and parts of speech are performed on all the historical queries containing the preset category tags, to filter out historical queries having defects such as low-accuracy sentence patterns, and/or inconsistent word segmentation boundaries, and the remaining historical queries are used as the query samples. In other words, for each historical query containing a preset category tag, the sentence pattern and part of speech of the historical query are analyzed. When the accuracy of the sentence pattern of the historical query is low, or the word segmentation boundaries are inconsistent, the historical query is removed; otherwise, the historical query is retained, thereby determining the plurality of query samples from all the historical queries containing the preset category tags.

In some embodiments, a Dependency Parser (depParser) tool may be used to analyze the sentence pattern on each of the historical queries. By analyzing the sentence pattern, dependence relationships between various words in the historical query can be analyzed, so as to determine the accuracy of the sentence pattern of the historical query. When the accuracy of the sentence pattern of the historical query is lower than a preset accuracy threshold, the historical query is removed; otherwise, the historical query is retained.

In some embodiments, a preset word segmentation tool may be used to analyze a part of speech on each of the historical queries, and identify the part of speech of each word in the historical query, so as to analyze whether the historical query has the defect of inconsistent word segmentation boundaries; and if so, the historical query is removed; otherwise, the historical query is retained.

In some embodiments, the query samples used for training the sequence labeling model are obtained through the above method based on the historical queries, and the sequence labeling model trained by using these query samples has a higher accuracy rate for category tag prediction.

In step 102, model training is performed on a preset neural network model, to obtain the sequence labeling model, by using the plurality of samples of queries as an input of the preset neural network model and using the pre-labeled category tags of the plurality of samples of queries as an output of the preset neural network model.

As shown in FIG. 2, the preset neural network model includes two pre-trained semantic representation models (i.e., a first semantic representation model and a second semantic representation model), two Bi-GRU layers (i.e., a first Bi-GRU layer and a second Bi-GRU layer), a CRF, and a CRF parsing layer. The first semantic representation model is connected with the second semantic representation model, the first Bi-GRU layer is connected with the second semantic representation model, the second Bi-GRU layer is connected with the first Bi-GRU layer, the CRF is connected with the second Bi-GRU layer, and the CRF parsing layer is connected to the CRF.

In some embodiments, a semantic representation model may be a pre-trained model. For example, the semantic representation model may be an ERNIE model, whose input is a query sample, and output is a word encoding of each word of the query sample. The word encoding of each word output by the semantic representation model is a 768-dimensional word vector sequence.

An input of a Bi-GRU layer is the word encoding of each word output by the semantic representation model, and an output of the Bi-GRU layer is the word encoding of each word and context information of each word. The context information of a word includes a word encoding of an adjacent word. The word encoding of each word output by the Bi-GRU layer is 512-dimensional.

An input of the CRF is the word encoding and context information of each word output by the Bi-GRU layer, an output of the CRF is a category to which each word belongs. The category to which a word belongs includes "B", "O", or "I" three types. "B" represents a beginning of a labeled category word; "I" represents a continuation of the labeled category word; and O represents irrelevant, i.e., a non-target category word. The category to which each word belongs is one-dimensional.

The CRF parsing layer is used to decode the category of each word output by the CRF, to finally map a final category (O/B/I) of each word.

For example, suppose that a query sample is "芝士蛋糕" (which is a Chinese word presenting "cheese cake"), and a pre-labeled category tag of the query sample is "蛋糕" (which is a Chinese word presenting "cake"). The query sample is input into the above-mentioned preset neural network model, and the preset neural network model will output "GOBI". Thus, the category tag "蛋糕" (which is a Chinese word presenting "cake") of the query sample output by the preset neural network model is obtained.

In step 102, the model training is performed on the preset neural network model, to obtain the sequence labeling model, by using each query sample as the input of the preset neural network model and using category tags corresponding to each query sample as the output of the preset neural network model. In the preset neural network model, the semantic representation model is a pre-trained model with fixed model parameters, while model parameters of the Bi-GRU layer, the CRF and the CRF parsing layer are initialized randomly at the beginning. In a process of the model training, the model parameters of the Bi-GRU layer, the CRF and the CRF parsing layer are mainly fine-tuned, and finally the sequence labeling model is obtained.

In the embodiments of the present disclosure, the sequence labeling model is obtained based on a large number of the query samples and the neural network model training based on deep learning. Compared with a traditional labeling model, the sequence labeling model does not need to perform cumbersome syntax and part-of-speech analysis, nor is restricted by the syntax in the query, which effectively improves the labeling effect of the sequence labeling model and achieves the labeling and mining of new category tags with high timeliness.

Figure 5:
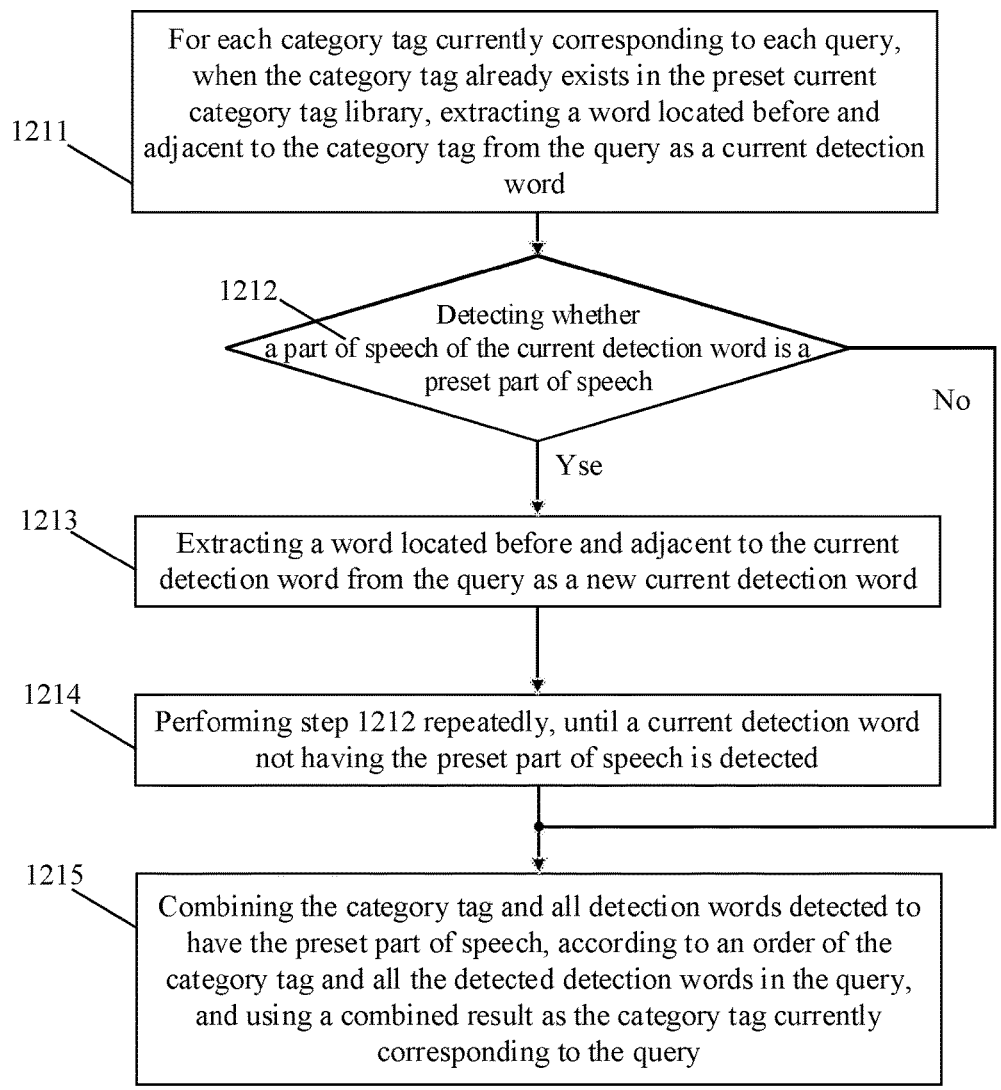
FIG. 5 is yet another flowchart of a new category tag mining method according to an embodiment of the present disclosure.

FIG. 5 is yet another flowchart of a new category tag mining method according to an embodiment of the present disclosure. In some embodiments, as shown in FIG. 5, a difference between this mining method and the mining method provided by any of the above-mentioned embodiments is that: before step 13, this mining method further includes the following steps 1211 to 1215. The following will only describe step 1211 to step 1215. For the description of other steps of this mining method, refer to the description of any of the above-mentioned embodiments for details.

In step 1211, for each category tag currently corresponding to each query, when the category tag already exists in the preset current category tag library, a word located before and adjacent to the category tag is extracted from the query as a current detection word.

As mentioned above, in step 12, the category tag currently corresponding to each query can be labeled by the sequence labeling model; and in step 1211, for each category tag currently corresponding to each query, it is determined whether the category tag already exists in the current category tag library or not. That is, it is judged whether the category tag is an existing category tag. If it is judged that the category tag does not exist in the current category tag library, no further processing is performed on the category tag. If it is judged that the category tag already exists in the current category tag library, the category tag is further expanded to dig out a more accurate category tag for the query. In some embodiments, when the category tag already exists in the preset current category tag library, the word located before and adjacent to the category tag is extracted from the query as the current detection word.

For example, the query is "Beijing Aviation Museum", and the category tag of the query is labeled as "museum" in the above step 12. Then in step 1211, when the category tag "museum" already exists in the current category tag library, the word "aviation" located before and adjacent to the category tag "museum" is extracted from the query, and "aviation" is taken as the current detection word.

In some embodiments, in step 1211, a word segmentation tool, such as a part-of-speech tagging (Lextag) tool, may be used to extract the word that is located before and adjacent to the category tag from the query.

In step 1212, it is detected whether a part of speech of the current detection word is a preset part of speech; and if so, perform step 1213; otherwise, perform step 1215.

The preset part of speech is any one of a noun, an adjective, and a noun adjective.

For example, the query is "Beijing Aviation Museum", the category tag of the query is labeled as "museum" in the above step 12, and the current detection word extracted in the above step 1211 is "aviation". Then in step 1212, it is detected whether the part of speech of "aviation" is the preset part of speech; that is, it is detected whether the part of speech of "aviation" is one of the noun (n), the adjective (a), or the noun adjective (an). Obviously, "aviation" is a noun (n), and thus it is proceed to step 1213 for further expansion.

In some embodiments, in step 1212, a part-of-speech detection tool, such as the Lextag tool, may be used to detect whether the part of speech of the current detection word is the preset part of speech.

In step 1213, a word located before and adjacent to the current detection word is extracted from the query as a new current detection word.

For example, the query is "Beijing Aviation Museum", the category tag of the query is labeled as "museum" in the above step 12; the current detection word extracted in the above step 1211 is "aviation"; and the part of speech of "aviation" is detected to be the preset part of speech in step 1212, that is, the part of speech of "aviation" is detected to be a noun (n). Then in step 1213, the word "Beijing" located before and adjacent to the current detection word "aviation" is extracted from the query as the new current detection word, and the word to be detected currently is "Beijing".

In some embodiments, in step 1213, the word segmentation tool, such as the Lextag tool, may be used to extract the word that is located before and adjacent to the current detection word from the query as the new current detection word.

In step 1214, step 1212 is performed repeatedly, until a current detection word not having the preset part of speech is detected.

For example, the query is "Beijing Aviation Museum", and the current detection word extracted in the above step 1213 is "Beijing". Then in step 1214, step 1212 is executed again to detect whether the part of speech of the current detection word "Beijing" is the preset part of speech or not. Obviously, the part of speech of "Beijing" is a place name (ns), which does not belong to the preset part of speech; and then stop the detection and it is proceed to step 1215.

In step 1215, the category tag and all detection words detected to have the preset part of speech are combined, according to an order of the category tag and all the detected detection words in the query, and a combined result is used as the category tag currently corresponding to the query.

For example, as mentioned above, the query is "Beijing Aviation Museum", and through the above steps 1211 to 1214, only the word "aviation" is detected to have the preset part of speech. Therefore, in step 1215, the category tag "museum" and the word "aviation" detected to have the preset part of speech are combined according to the order of "museum" and "aviation" in the query, and use the combined result, i.e., "aviation museum", as the category tag currently corresponding to the query. That is, the category tag of the query is expanded from "museum" to "aviation museum".

It should be noted that if the current detection word is a word located before and adjacent to the category tag, and it is detected that the current detection word is not the preset part of speech in step 1212, then in step 1215, a set of detection words detected to have the preset part of speech is an empty set; and thus, the combined result is still the category tag, that is, the category tag currently corresponding to the query is unchanged.

In some embodiments, before step 13, for each category tag labeled in step 12, when the category tag already exists in the current category tag library, the category tag is expanded to obtain a more accurate category tag through the above steps 1211 to 1215; while when the category tag does not exist in the current category tag library, or it is determined that the category tag cannot be expanded through the above steps 1211 to 1215, the category tag remains unchanged.

In the embodiments of the present disclosure, through the above steps 1211 to 1215, the quality of the category tag output by the sequence labeling model is monitored, which can effectively improve the accuracy and recall rate of category tag mining while ensuring the high timeliness of the labeling and mining.

Figure 6:
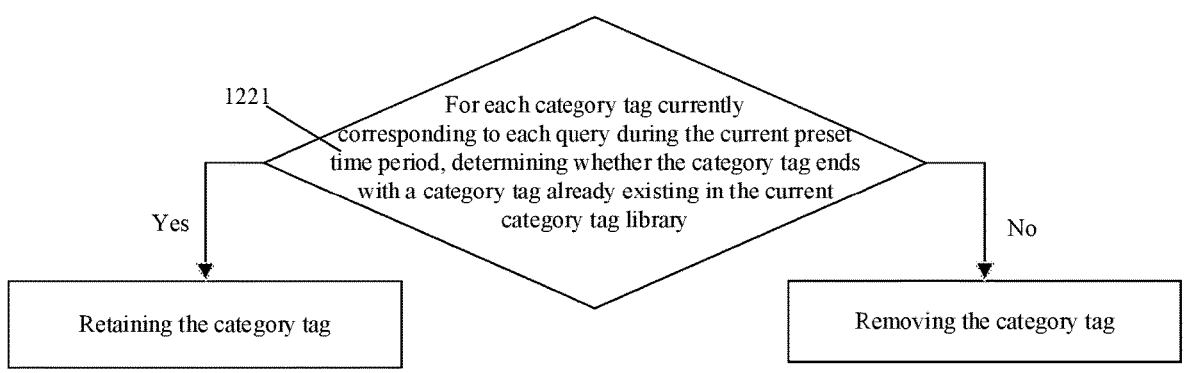
FIG. 6 is still another flowchart of a new category tag mining method according to an embodiment of the present disclosure.

FIG. 6 is still another flowchart of a new category tag mining method according to an embodiment of the present disclosure. In some embodiments, as shown in FIG. 6, a difference between this mining method and the mining method provided by any of the above-mentioned embodiments is that: before step 13, this mining method further includes the following step 1221. The following will only describe step 1221. For the description of other steps of this mining method, refer to the description of any of the above-mentioned embodiments for details.

In step 1221, for each category tag currently corresponding to each query during the current preset time period, it is determined whether the category tag ends with a category tag that already exists in the current category tag library; and if so, the category tag is retained; otherwise, the category tag is removed.

In step 1221, the category tag needs to be segmented firstly. Specifically, a word segmentation tool may be used to segment the words. After segmenting the words, it is determined whether the word at the end of the category tag is consistent with a category tag existing in the current category tag library; that is, it is determined whether the word at the end of the category tag already exists in the current category tag library. When it is determined that the word at the end of the category tag already exists in the current category tag library, the category tag currently corresponding to the query is retained; otherwise, the category tag is removed.

In some embodiments, the above step 1221 may be performed after the above step 1215 and before the above step 13. In some embodiments, the above step 1221 may also be performed after the above step 12 and before the above step 1211.

It should be understood that, in some embodiments, the category tags currently corresponding to all the queries in step 13, are all the category tags that are finally retained after the process of step 1221, and/or the process of steps 1211 to 1215.

In the embodiments of the present disclosure, through the above step 1221, the quality of the category tag output by the sequence labeling model is monitored, which can effectively improve the accuracy and recall rate of category tag mining while ensuring the high timeliness of the labeling and mining.

Figure 7:
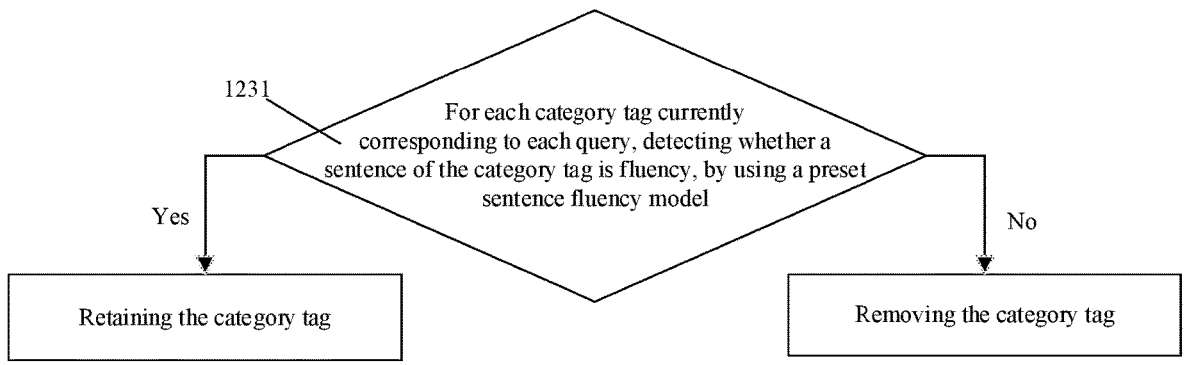
FIG. 7 is yet another flowchart of a new category tag mining method according to an embodiment of the present disclosure.

FIG. 7 is yet another flowchart of a new category tag mining method according to an embodiment of the present disclosure. In some embodiments, as shown in FIG. 7, a difference between this mining method and the mining method provided by any of the above-mentioned embodiments is that: before step 13, this mining method further includes the following step 1231. The following will only describe step 1231. For the description of other steps of this mining method, refer to the description of any of the above-mentioned embodiments for details.

In step 1231, for each category tag currently corresponding to each query, it is detected whether a sentence of the category tag is fluency, by using a preset sentence fluency model; and if so, the category tag is retained; otherwise, the category tag is removed.

In step 1231, for each category tag currently corresponding to each query, the preset sentence fluency model is used to detect a sentence fluency of the category tag. When the sentence fluency of the category tag is greater than or equal to a preset fluency threshold, it is detected that the sentence of the category tag is fluent, and thus the category tag is retained. When the sentence fluency of the category tag is less than the preset fluency threshold, it is detected that the sentence of the category tag is not fluent, and thus the category tag is removed.

In some embodiments, through the above step 1231, a category tag whose sentence is not fluent can be filtered out from all the category tags labeled in the above step 12, so as to obtain a fluent category tag.

In some embodiments, the above step 1231 may be performed after the above step 12 and before the above step 1211. In some embodiments, the above step 1231 may also be performed after the above step 1215 and before the above step 13. In some embodiments, the above step 1231 may also be performed after the above step 1221 or before the above step 1221.

It should be understood that, in some embodiments, the category tags currently corresponding to all the queries in step 13, are all the category tags that are finally retained after the process of steps 1211 to 1215, the process of step 1221, and/or the process of step 1231.

In the embodiments of the present disclosure, through the above step 1231, the quality of the category tag output by the sequence labeling model is monitored, which can effectively improve the accuracy and recall rate of category tag mining while ensuring the high timeliness of the labeling and mining.

Figure 8:
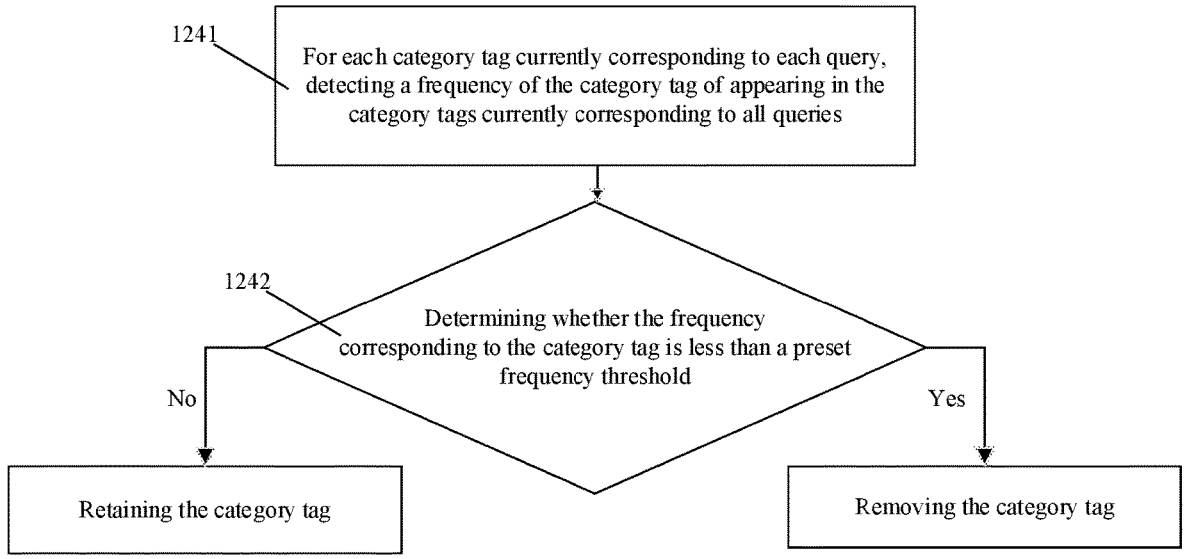
FIG. 8 is yet another flowchart of a new category tag mining method according to an embodiment of the present disclosure.

FIG. 8 is yet another flowchart of a new category tag mining method according to an embodiment of the present disclosure. In some embodiments, as shown in FIG. 8, a difference between this mining method and the mining method provided by any of the above-mentioned embodiments is that: before step 13, this mining method further includes the following steps 1241 and 1242. The following will only describe steps 1241 and 1242. For the description of other steps of this mining method, refer to the description of any of the above-mentioned embodiments for details.

In step 1241, for each category tag currently corresponding to each query, a frequency of the category tag of appearing in the category tags currently corresponding to all the queries is detected.

In step 1242, it is determined whether the frequency corresponding to the category tag is less than a preset frequency threshold; and if so, the category tag is removed; otherwise, the category tag is retained.

For example, if the preset frequency threshold is 5 times and the current preset time period is one day, then in step 1242, it is detected whether the category tag appears in the category tags of all the queries during the current one day time period less than 5 times; and if so, the category tag is removed; otherwise, the category tag is retained.

In some embodiments, through the above steps 1241 and 1242, a category tag with a lower frequency of occurrence can be filtered out, so as to obtain a category tag with a higher frequency of occurrence.

In some embodiments, steps 1241 and 1242 may be performed after the above step 12 and before the above step 1211. In some embodiments, steps 1241 and 1242 may also be performed after the above step 1215 and before the above step 13. In some embodiments, steps 1241 and 1242 may also be performed before or after the above step 1221. In some embodiments, steps 1241 and 1242 may also be performed before or after the above step 1231.

It should be understood that, in some embodiments, the category tags currently corresponding to all the queries in step 13, are all the category tags that are finally retained after the process of steps 1211 to 1215, the process of step 1221, the process of step 1231, and/or the process of steps 1241 to 1242.

In the embodiments of the present disclosure, through the above steps 1241, the quality of the category tag output by the sequence labeling model is monitored, which can effectively improve the accuracy and recall rate of category tag mining while ensuring the high timeliness of the labeling and mining.

Figure 9:
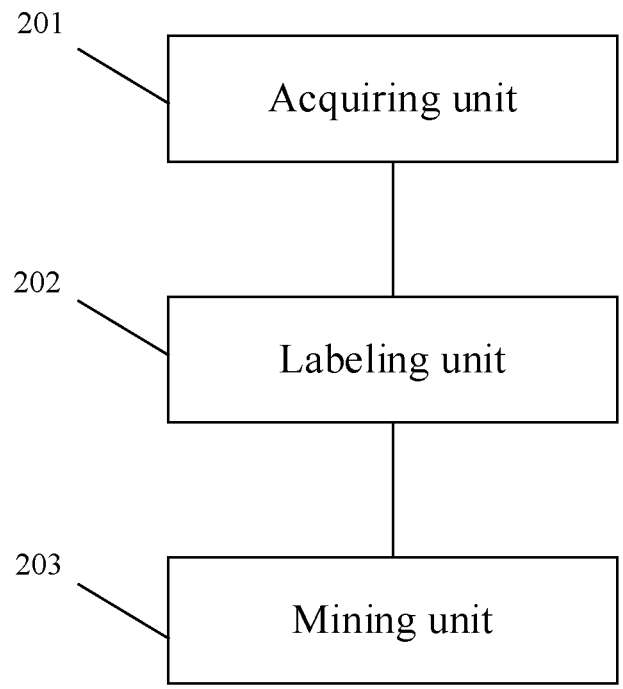
FIG. 9 is a block diagram of a new category tag mining device according to an embodiment of the present disclosure.

FIG. 9 is a block diagram of a new category tag mining device according to an embodiment of the present disclosure. As shown in FIG. 9, in the embodiments of the present disclosure, the mining device may include an acquiring unit 201, a labeling unit 202 and a mining unit 203.

The acquiring unit 201 is configured to obtain a plurality of queries during a current preset time period.

The labeling unit 202 is configured to label a category tag on each query of the plurality of queries, by using a pre-trained sequence labeling model, to extract the category tag currently corresponding to the query from the query.

The mining unit 203 is configured to remove a category tag already existing in a preset current category tag library from category tags currently corresponding to all the queries, and determine a remaining category tag as a new category tag.

Figure 10:
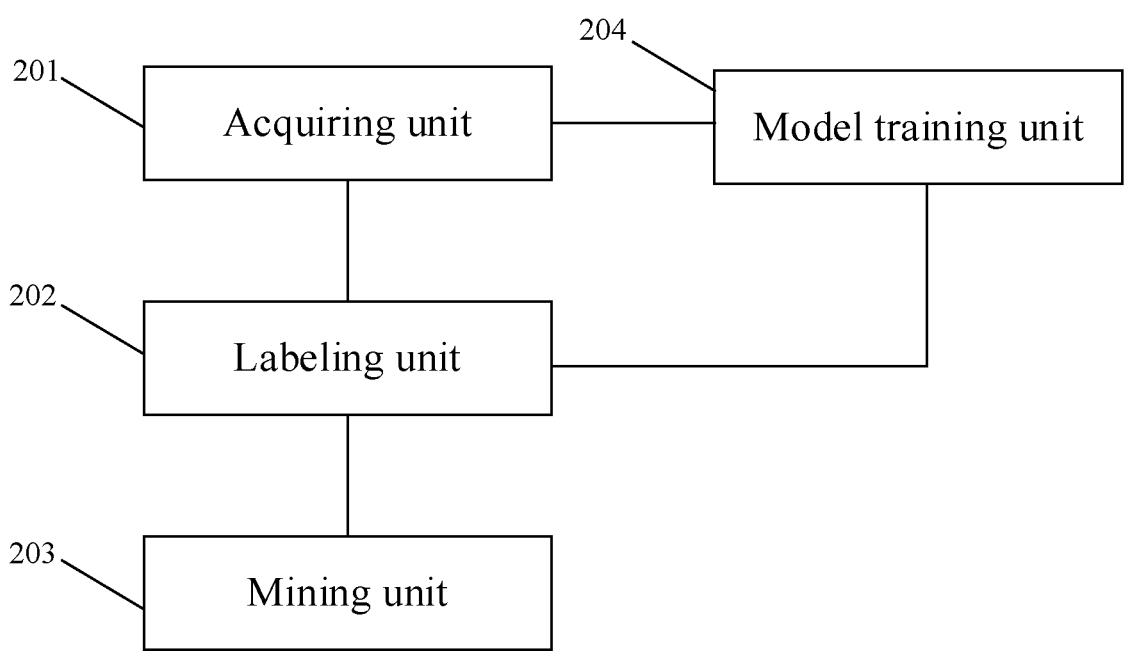
FIG. 10 is another block diagram of a new category tag mining device according to an embodiment of the present disclosure.

FIG. 10 is another block diagram of a new category tag mining device according to an embodiment of the present disclosure. In some embodiments, as shown in FIG. 10, the mining device may further include a model training unit 204. The acquiring unit 201 is further configured to obtain a plurality of samples of queries pre-labeled with category tags. The model training unit 204 is configured to perform model training on a preset neural network model, by using the plurality of samples of queries as an input of the preset neural network model and using the pre-labeled category tags of the plurality of samples of queries as an output of the preset neural network model, to obtain the sequence labeling model. The preset neural network model may include a first semantic representation model, a second semantic representation model connected with the first semantic representation model, a first Bi-GRU layer connected with the second semantic representation model, a second Bi-GRU layer connected with the first Bi-GRU layer, a CRF connected with the second Bi-GRU layer, and a CRF parsing layer connected with the CRF.

Figure 11:
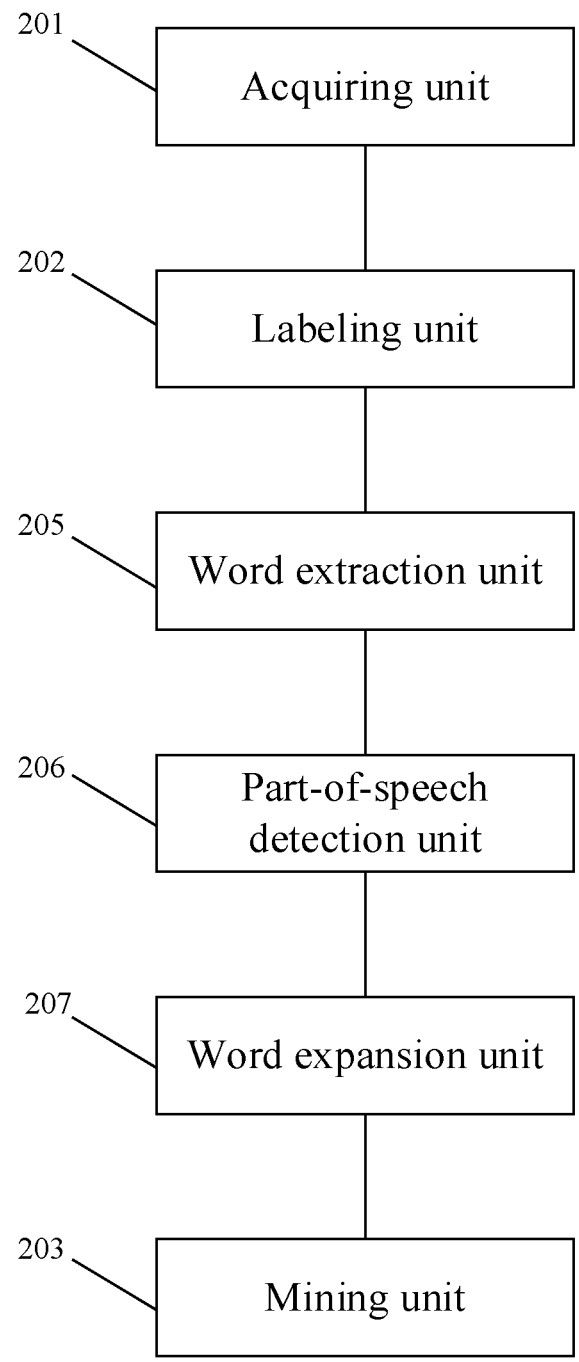
FIG. 11 is yet another block diagram of a new category tag mining device according to an embodiment of the present disclosure.

FIG. 11 is yet another block diagram of a new category tag mining device according to an embodiment of the present disclosure. In some embodiments, as shown in FIG. 11, the mining device may further include a word extraction unit 205, a part-of-speech detection unit 206 and a word expansion unit 207.

The word extraction unit 205 is configured to, for each category tag currently corresponding to the query, extract a word located before and adjacent to the category tag from the query as a current detection word, when the category tag already exists in the preset current category tag library.

The part-of-speech detection unit 206 is configured to detect whether a part of speech of the current detection word is a preset part of speech. The preset part of speech is any one of a noun, an adjective, and a noun adjective.

The word extraction unit 205 is further configured to extract a word located before and adjacent to the current detection word from the query as a new current detection word, when the part-of-speech detection unit 206 determines that the part of speech of the current detection word is the preset part of speech; and trigger the part-of-speech detection unit 206 to repeat the step of detecting whether the part of speech of the current detection word is the preset part of speech, until a current detection word not having the preset part of speech is detected by the part-of-speech detection unit 206.

The word expansion unit 207 is configured to combine the category tag and all detection words detected to have the preset part of speech, according to an order of the category tag and all the detected detection words in the query, and use a combined result as the category tag currently corresponding to the query.

Figure 12:
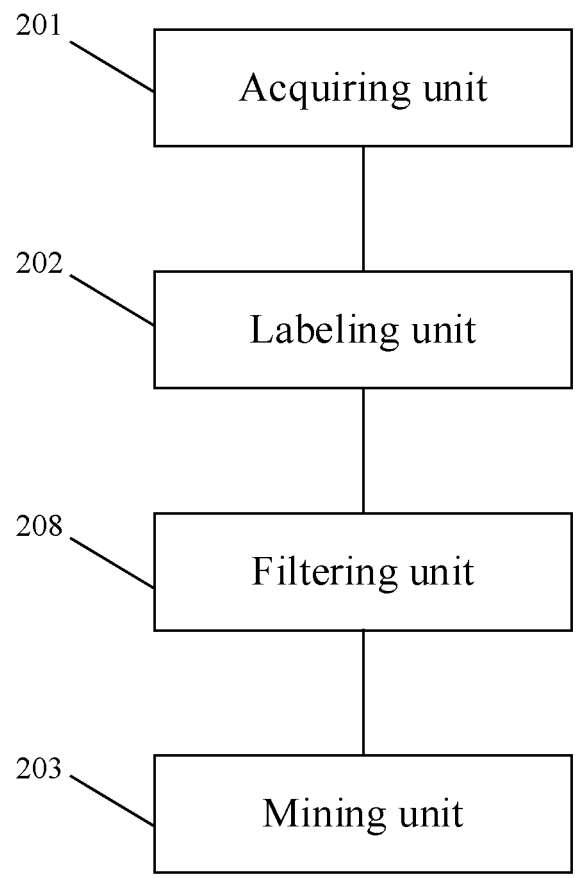
FIG. 12 is still another block diagram of a new category tag mining device according to an embodiment of the present disclosure.

FIG. 12 is still another block diagram of a new category tag mining device according to an embodiment of the present disclosure. In some embodiments, as shown in FIG. 12, the mining device may further include a filtering unit 208. The filtering unit 208 is configured to, for each category tag currently corresponding to the query during the current preset time period, determine whether the category tag ends with a category tag being in the current category tag library; retain the category tag currently corresponding to the query, when the category tag ends with the category tag already existing in the current category tag library; and remove the category tag, when the category tag does not end with the category tag already existing in the current category tag library.

Figure 13:
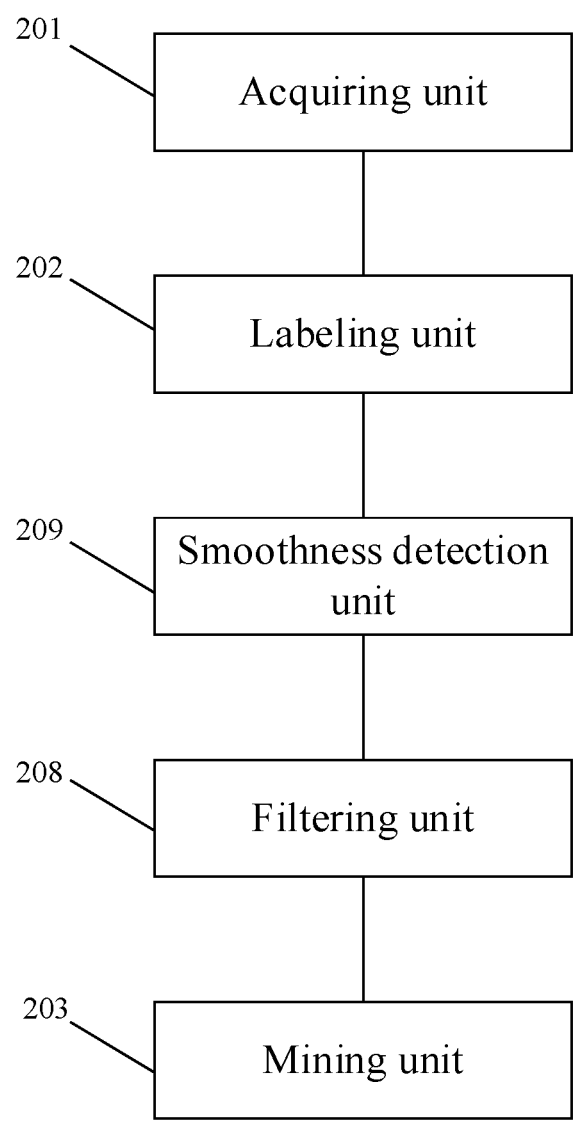
FIG. 13 is yet another block diagram of a new category tag mining device according to an embodiment of the present disclosure.

FIG. 13 is yet another block diagram of a new category tag mining device according to an embodiment of the present disclosure. In some embodiments, as shown in FIG. 13, the mining device may further include a smoothness detection unit 209. The smoothness detection unit 209 is configured to, for each category tag currently corresponding to the query, detect whether a sentence of the category tag is fluency, by using a preset sentence fluency model. The filtering unit 208 is further configured to retain the category tag currently corresponding to the query, when the smoothness detection unit 209 determines that the sentence of the category tag is fluency; and remove the category tag, when the smoothness detection unit 209 determines that the sentence of the category tag is not fluency.

Figure 14:
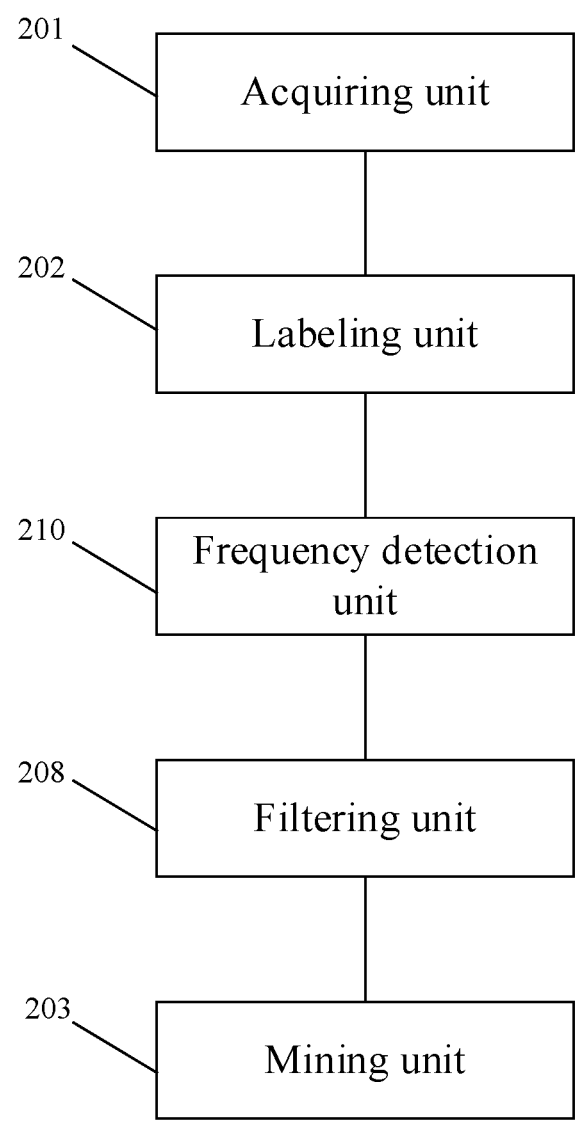
FIG. 14 is yet another block diagram of a new category tag mining device according to an embodiment of the present disclosure.

FIG. 14 is yet another block diagram of a new category tag mining device according to an embodiment of the present disclosure. In some embodiments, as shown in FIG. 14, the mining device may further include a frequency detection unit 210. The frequency detection unit 210 is configured to, for each category tag currently corresponding to the query, detect a frequency of the category tag of appearing in the category tags currently corresponding to all the queries. The filtering unit 208 is further configured to retain the category tag currently corresponding to the query, when the frequency is greater than or equal to a preset frequency threshold; and remove the category tag, when the frequency is less than the preset frequency threshold.

In some embodiments, the acquiring unit 201 is configured to obtain a plurality of historical queries and a plurality of preset category tags; filter all historical queries containing at least one of the preset category tags out from all the historical queries, by using a distant supervision method; and determine the plurality of samples of queries from all the historical queries containing at least one of the preset category tags.

In addition, the new category tag mining device provided by the embodiments of the present disclosure may be specifically used to implement the above-mentioned mining method. Refer to the description of the above-mentioned mining method for details, which will not be repeated herein.

Figure 15:
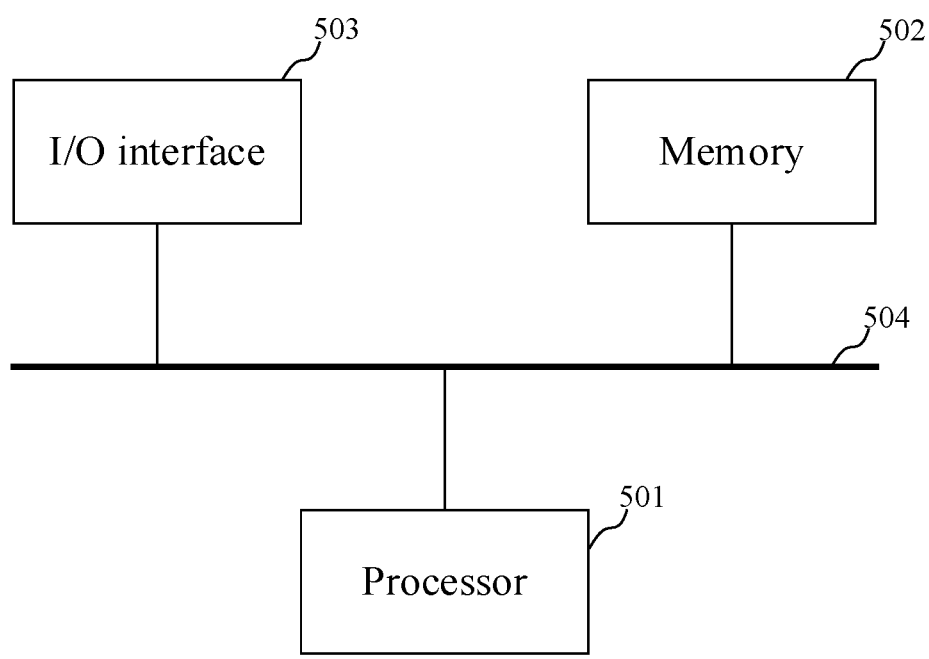
FIG. 15 is a block diagram of an electronic device according to an embodiment of the present disclosure.

FIG. 15 is a block diagram of an electronic device according to an embodiment of the present disclosure. As shown in FIG. 15, the electronic device may include: at least one processor 501; a memory 502 storing at least one program thereon, wherein when the at least one program is executed by the at least one processor, the at least one processor implements the mining method described in any one of the above embodiments; and at least one I/O interface 503 connected between the at least one processor and the memory, and configured to implement information interaction between the at least one processor and the memory.

The processor 501 is a device having a data processing capability, and includes, but is not limited to, a central processing unit (CPU) and the like. The memory 502 is a device having a data storage capability, and includes, but is not limited to, a random access memory (RAM, more specifically, such as a synchronous dynamic RAM (SDRAM), a double data rate SDRAM (DDR SDRAM), etc.), a read only memory (ROM), an Electrically Erasable Programmable read only memory (EEPROM), and a Flash memory (FLASH). The I/O interface (read/write interface) 503 is connected between the processor 501 and the memory 502, enables the information interaction between the processor 501 and the memory 502, and includes, but is not limited to, a data bus etc.

In some embodiments, the processor 501, the memory 502, and the I/O interface 503 are connected to each other through a bus 504, so as to be further connected to the other components of the electronic device.

The embodiments of the present disclosure also provide a non-transitory computer-readable storage medium storing a computer program thereon. When the computer program is executed, the above-mentioned new category tag mining method is realized.

It should be understood by those skilled in the art that the functional modules/units in all or some of the steps, systems, and devices in the method disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or step may be performed through cooperation of several physical components. Some or all of the physical components may be implemented as software executed by a processor, such as a central processing unit, a digital signal processor, or a microprocessor, or may be implemented as hardware, or may be implemented as an integrated circuit, such as an application specific integrated circuit. Such software may be distributed on computer-readable media, which may include computer storage media (or non-transitory media) and communication media (or transitory media). As well known by those skilled in the art, the term "computer storage media" includes volatile/nonvolatile and removable/non-removable media used in any method or technology for storing information (such as computer-readable instructions, data structures, program modules and other data). The computer storage media include, but are not limited to, RAM, ROM, EEPROM, flash memory or other memory techniques, CD-ROM, digital versatile disk (DVD) or other optical discs, magnetic cassette, magnetic tape, magnetic disk or other magnetic storage devices, or any other media which can be used to store the desired information and can be accessed by a computer. In addition, it is well known by those skilled in the art that the communication media generally include computer-readable instructions, data structures, program modules or other data in a modulated data signal, such as a carrier wave or other transmission mechanism, and may include any information delivery media.

It should be understood that both the exemplary embodiments and the specific terms disclosed in the present disclosure are for the purpose of illustration, rather than for limiting the present disclosure. It is obvious to those skilled in the art that the features, characteristics and/or elements described in connection with a particular embodiment may be used alone or in combination with the features, characteristics and/or elements described in connection with other embodiments in some examples, unless expressly indicated otherwise. Therefore, it should be understood by those skilled in the art that various changes in form and detail may be made without departing from the scope of the present disclosure as set forth in the appended claims.

The invention claimed is:

1. A computer implemented new category tag mining method performed by a hardware processor and comprising the following steps:
   obtaining a plurality of queries during a current preset time period;
   labeling a category tag on each query of the plurality of queries, by using a pre-trained sequence labeling model, to extract the category tag currently corresponding to the query from the query;
   determining, for each of the category tags currently corresponding to all the queries, whether the category tag ends with a category tag stored in a current category tag library, wherein the current category tag library stores existing category tags that have been mined;
   determining, in response to determining that the category tag ends with a category tag stored in the current category tag library, whether the category tag is an existing category tag in the current category tag library;
   mining, in response to determining that the category tag is not an existing category tag in the current category tag library, the category tag as a new category tag; and
   storing the new category tag in the current category tag library to update the current category tag library.

2. The computer implemented new category tag mining method according to claim 1, further comprising steps performed by the hardware processor:
   obtaining a plurality of samples of queries pre-labeled with category tags; and
   performing model training on a preset neural network model, by using the plurality of samples of queries as an input of the preset neural network model and using the pre-labeled category tags of the plurality of samples of queries as an output of the preset neural network model, to obtain the sequence labeling model.

3. The computer implemented new category tag mining method according to claim 2, wherein the preset neural network model comprises a first semantic representation model, a second semantic representation model connected with the first semantic representation model, a first bidirectional Gated Recurrent Unit (GRU) layer connected with the second semantic representation model, a second bidirectional GRU layer connected with the first bidirectional GRU layer, a conditional random field connected with the second bidirectional GRU layer, and a conditional random field parsing layer connected with the conditional random field.

4. The computer implemented new category tag mining method according to claim 2, wherein the step of obtaining the plurality of samples of queries pre-labeled with the category tags comprises:
   obtaining a plurality of historical queries and a plurality of preset category tags;
   filtering all historical queries containing at least one of the preset category tags out from all the historical queries, by using a distant supervision method; and
   determining the plurality of samples of queries from all the historical queries containing at least one of the preset category tags.

5. The computer implemented new category tag mining method according to claim 1, before the step of determining, for each of the category tags currently corresponding to all the queries, whether the category tag ends with a category tag stored in the current category tag library further comprising steps performed by the hardware processor:
   for each category tag currently corresponding to the query, extracting a word located before and adjacent to the category tag from the query as a current detection word, in response to the category tag being in the current category tag library;
   detecting whether a part of speech of the current detection word is a preset part of speech, wherein the preset part of speech is any one of a noun, an adjective, and a noun adjective;

extracting a word located before and adjacent to the current detection word from the query as a new current detection word, in response to the part of speech of the current detection word being the preset part of speech;

repeating the step of detecting whether the part of speech of the current detection word is the preset part of speech, until a current detection word not having the preset part of speech is detected; and combining the category tag and all detection words detected to have the preset part of speech, according to an order of the category tag and all the detected detection words in the query, and using a combined result as the category tag currently corresponding to the query.

6. The computer implemented new category tag mining method according to claim 5, determining, for each of the category tags currently corresponding to all the queries, whether the category tag ends with a category tag stored in the current category tag library further comprising steps performed by the hardware processor:

for each category tag currently corresponding to the query, detecting whether a sentence of the category tag is fluency, by using a preset sentence fluency model;

retaining the category tag, in response to the sentence of the category tag being fluency; and removing the category tag from the category tags currently corresponding to all the queries, in response to the sentence of the category tag being not fluency.

7. The computer implemented new category tag mining method according to claim 5, before the step of determining, for each of the category tags currently corresponding to all the queries, whether the category tag ends with a category tag stored in the current category tag library further comprising steps performed by the hardware processor:

for each category tag currently corresponding to the query, detecting a frequency of the category tag of appearing in the category tags currently corresponding to all the queries;

retaining the category tag, in response to the frequency being greater than or equal to a preset frequency threshold; and removing the category tag from the category tags currently corresponding to all the queries, in response to the frequency being less than the preset frequency threshold.

8. The computer implemented new category tag mining method according to claim 1, before the step of determining, for each of the category tags currently corresponding to all the queries, whether the category tag ends with a category tag stored in the current category tag library further comprising steps performed by the hardware processor:

for each category tag currently corresponding to the query, detecting whether a sentence of the category tag is fluency, by using a preset sentence fluency model;

retaining the category tag, in response to the sentence of the category tag being fluency; and removing the category tag from the category tags currently corresponding to all the queries, in response to the sentence of the category tag being not fluency.

9. The computer implemented new category tag mining method according to claim 1, before the step of determining, for each of the category tags currently corresponding to all the queries, whether the category tag ends with a category tag stored in the current category tag library further comprising steps performed by the hardware processor:

for each category tag currently corresponding to the query, detecting a frequency of the category tag of appearing in the category tags currently corresponding to all the queries;

retaining the category tag, in response to the frequency being greater than or equal to a preset frequency threshold; and removing the category tag from the category tags currently corresponding to all the queries, in response to the frequency being less than the preset frequency threshold.

10. An electronic device, comprising:

at least one processor;

a memory storing at least one program thereon; and at least one I/O interface connected between the at least one processor and the memory, and configured to implement information interaction between the at least one processor and the memory;

wherein when the at least one program is executed by the at least one processor, the at least one processor implements:

obtaining a plurality of queries during a current preset time period;

labeling a category tag on each query of the plurality of queries, by using a pre-trained sequence labeling model, to extract the category tag currently corresponding to the query from the query;

determining, for each of the category tags currently corresponding to all the queries, whether the category tag ends with a category tag stored in a current category tag library, wherein the current category tag library stores existing category tags that have been mined;

determining, in response to determining that the category tag ends with a category tag stored in the current category tag library, whether the category tag is an existing category tag in the current category tag library;

mining, in response to determining that the category tag is not an existing category tag in the current category tag library, the category tag as a new category tag; and storing the new category tag in the current category tag library to update the current category tag library.

11. The electronic device according to claim 10, wherein the at least one processor is configured to:

obtain a plurality of samples of queries pre-labeled with category tags; and perform model training on a preset neural network model, by using the plurality of samples of queries as an input of the preset neural network model and using the pre-labeled category tags of the plurality of samples of queries as an output of the preset neural network model, to obtain the sequence labeling model;

wherein the preset neural network model comprises a first semantic representation model, a second semantic representation model connected with the first semantic representation model, a first bidirectional Gated Recurrent Unit (GRU) layer connected with the second semantic representation model, a second bidirectional GRU layer connected with the first bidirectional GRU layer, a conditional random field connected with the second bidirectional GRU layer, and a conditional random field parsing layer connected with the conditional random field.

12. The electronic device according to claim 11, wherein the at least one processor is configured to:

obtain a plurality of historical queries and a plurality of preset category tags;

filter all historical queries containing at least one of the preset category tags out from all the historical queries, by using a distant supervision method; and determine the plurality of samples of queries from all the historical queries containing at least one of the preset category tags.

13. The electronic device according to claim 10, wherein before determining, for each of the category tags currently corresponding to all the queries, whether the category tag ends with a category tag stored in the current category tag library the at least one processor is configured to:

for each category tag currently corresponding to the query, extract a word located before and adjacent to the category tag from the query as a current detection word, in response to the category tag being in the current category tag library;

detect whether a part of speech of the current detection word is a preset part of speech, wherein the preset part of speech is any one of a noun, an adjective, and a noun adjective;

extract a word located before and adjacent to the current detection word from the query as a new current detection word, in response to the part of speech of the current detection word being the preset part of speech;

repeat the step of detecting whether the part of speech of the current detection word is the preset part of speech, until a current detection word not having the preset part of speech is detected; and combine the category tag and all detection words detected to have the preset part of speech, according to an order of the category tag and all the detected detection words in the query, and use a combined result as the category tag currently corresponding to the query.

14. The electronic device according to claim 10, wherein before determining, for each of the category tags currently corresponding to all the queries, whether the category tag ends with a category tag stored in the current category tag library the at least one processor is configured to:

for each category tag currently corresponding to the query, detect whether a sentence of the category tag is fluency, by using a preset sentence fluency model;

retain the category tag, in response to the sentence of the category tag being fluency; and remove the category tag from the category tags currently corresponding to all the queries, in response to the sentence of the category tag being not fluency.

15. The electronic device according to claim 10, wherein before determining, for each of the category tags currently corresponding to all the queries, whether the category tag ends with a category tag stored in the current category tag library the at least one processor is configured to:

for each category tag currently corresponding to the query, detect a frequency of the category tag of appearing in the category tags currently corresponding to all the queries;

retain the category tag, in response to the frequency being greater than or equal to a preset frequency threshold; and remove the category tag from the category tags currently corresponding to all the queries, in response to the frequency being less than the preset frequency threshold.

16. A non-transitory computer-readable storage medium storing a computer program thereon, wherein when the computer program is executed by a hardware processor, the hardware process implements:

obtaining a plurality of queries during a current preset time period;

labeling a category tag on each query of the plurality of queries, by using a pre-trained sequence labeling model, to extract the category tag currently corresponding to the query from the query;

determining, for each of the category tags currently corresponding to all the queries, whether the category tag ends with a category tag stored in a current category tag library, wherein the current category tag library stores existing category tags that have been mined;

determining, in response to determining that the category tag ends with a category tag stored in the current category tag library, whether the category tag is an existing category tag in the current category tag library;

mining, in response to determining that the category tag is not an existing category tag in the current category tag library, the category tag as a new category tag; and storing the new category tag in the current category tag library to update the current category tag library.

* * * * *